US006445974B1

United States Patent
Malaugh et al.

(10) Patent No.: US 6,445,974 B1
(45) Date of Patent: Sep. 3, 2002

(54) CAD-NEUTRAL APPLICATION PROGRAMMING INTERFACE

(75) Inventors: Jim M Malaugh; David Croom, both of Madison, AL (US)

(73) Assignee: Intergraph Corporation, AL (US)

(*) Notice: Subject to any disclaimer, the term of this patent is extended or adjusted under 35 U.S.C. 154(b) by 0 days.

(21) Appl. No.: 09/473,772

(22) Filed: Dec. 29, 1999

Related U.S. Application Data

(60) Provisional application No. 60/114,216, filed on Dec. 30, 1998.

(51) Int. Cl.[7] .............................................. G06F 19/00
(52) U.S. Cl. ..................... 700/182; 700/97; 700/98; 700/180; 700/181; 703/1; 703/23; 703/26; 703/27; 345/418; 345/419; 345/420; 345/964
(58) Field of Search ............................... 700/17–20, 57, 700/97–98, 87, 159, 160, 180, 182, 183, 184; 345/418, 419, 420, 964; 716/1–3, 5–6, 7, 17–18; 703/1, 26–27, 23–25; 707/102; 709/205

(56) References Cited

U.S. PATENT DOCUMENTS

| | | | | |
|---|---|---|---|---|
| 5,481,695 A | * | 1/1996 | Purks | 703/15 |
| 5,682,542 A | * | 10/1997 | Enomoto et al. | 707/516 |
| 5,689,711 A | * | 11/1997 | Bardasz et al. | 717/1 |
| 5,724,406 A | * | 3/1998 | Juster | 379/88.13 |
| 5,850,289 A | * | 12/1998 | Flower et al. | 350/376 |
| 5,850,535 A | * | 12/1998 | Maystrovsky et al. | 703/2 |
| 5,852,442 A | * | 12/1998 | Morito | 345/419 |
| 5,905,501 A | * | 5/1999 | Kato | 245/420 |
| 5,912,739 A | * | 6/1999 | Flower et al. | 356/376 |
| 5,963,451 A | * | 10/1999 | Seki et al. | 700/182 |

* cited by examiner

*Primary Examiner*—Ramesh Patel
(74) *Attorney, Agent, or Firm*—Townsend and Townsend and Crew LLP

(57) ABSTRACT

Apparatus and method for a computer-aided design (CAD) system for dynamically switching from one CAD platform to another CAD platform. The invention includes building a library of generic CAD functions, each for directing a graphical manipulation process. Each one of the generic CAD functions is based on a platform-specific CAD function, there being a large number of common CAD functions among many different CAD platforms. The invention interprets received function calls and translates the call to a generic function call for invoking a generic CAD function. A processor then executes the generic CAD function, irrespective of the platform used to call the function.

12 Claims, 5 Drawing Sheets

CAD-NEUTRAL APPLICATION PROGRAMMING INTERFACE

CROSS-REFERENCES TO RELATED APPLICATIONS

This application claims priority from Provisional U.S. patent application Ser. No. 60/114,216, filed Dec. 30, 1998, the disclosure of which is incorporated herein in its entirety by reference for all purposes.

BACKGROUND OF THE INVENTION

The present invention generally relates to computer-aided design (CAD) software and more particularly to a computer-based system and method for building generic function calls for dynamically switching between different CAD platforms.

Computer-aided design (CAD) generally refers to the application of computers to the product development process by developing computer models of those products. Almost any product, and any form thereof, can be modeled by one of a plethora of CAD systems. Products are normally modeled on the basis of certain properties, such as form, dimension, tolerance and structure. Important aspects of these properties are geometry, imagery, and spatial manipulation. Thus, CAD systems rely heavily on computational geometry and computer graphics.

FIG. 1 illustrates a simplified block diagram of a CAD platform 14 in a CAD system 10. Examples of CAD platforms are MicroStation, AutoCAD, Visio, Intellicad, Imagineer, etc. The CAD system includes a data source 12, including a database 18 for storing volatile or nonvolatile information, and working data 20 that may include model data representing computational modeling of entities of a product being designed. The working data 20 is usually stored temporarily in random access memory (RAM), or retrieved from more permanent memory in the database 18. The working data represents information utilized by the CAD platform 14 for performing CAD functions on the entity and data representative thereof.

The CAD platform is a computer-based tool for performing different functions of design processes. Common functions of the CAD platform include instructions for model definition 22, manipulation 24 of a model or model data, and generation of a picture 26 based on the model. Further, the CAD platform includes utilities 28 to assist a CAD user in carrying out CAD fiunctions, database management tools 30 for managing and controlling the configuration and organization of information contained in the database 18 or working data block 20, and any number of CAD applications 32. The applications 32 of the CAD platform include the specific CAD computer program code and function calls proprietary to the different CAD platforms listed above, as well as general functions performed by all CAD platforms. The applications 32 also include any applications programming interfaces (APIs) by which CAD users interact with the CAD platform. An input/output block 16 provides the conduit through which user commands and instructions are provided to the CAD platform.

The term "model" as used herein is a representation of an entity, which in turn is an abstract artifact or property of a design on which the actual product is based. Thus, a model is dependent on what property of the design is to be modeled. Each CAD platform generates model data representative of the entity, for manipulation according to computational instructions, or for display on a graphical display. Computational instructions are also known as function calls, which generally refer to a group of steps employed by the CAD platform for performing a certain manipulation on model data.

The computational and modeling methods and parameters employed by CAD systems, while having a certain degree of correspondence, are inherently different and often incompatible from one CAD platform to another. For example, a simple function such as drawing a square may involve computations of spatial geometry, coordinate functions, and three-dimensional rendering. Additional properties such as texture, shading, and illumination require many more computations and computer modeling techniques. The methods employed by one particular CAD platform for manipulating model data, or the platform-specific function calls with respect to particular model data, may vary considerably from the function calls of another particular CAD platform. The function calls generated from one of any of these CAD platforms may be different from and unrecognizable by any other CAD platform.

What is needed is a system and method for building one set of executable generic function calls on any CAD platform, which are able to be executed on any of a variety of other CAD platforms with equivalent functionality and preserve as much of the computational integrity of the product as possible.

SUMMARY OF THE INVENTION

The present invention provides a system and method for CAD platform-neutral operation in a CAD system. A CAD system includes a processor for executing one of a plurality of CAD platforms and a memory for storing a plurality of generic CAD functions, where the generic CAD functions are emulated after functions supported by a selected one of the plurality of CAD platforms. In one embodiment of the present invention, a method of executing neutral CAD functions includes the steps of determining which one of the plurality of the CAD platform is running, receiving a call to a specific CAD function via the running CAD platform, and forwarding the call directly to the running CAD platform if the running CAD platform is equivalent to the selected CAD platforms, otherwise redirecting the call to a corresponding one of the generic CAD functions in the memory.

In another embodiment of the present invention, a method is provided for executing functional manipulations of model data representing an entity, wherein specific functions of the functional manipulations are addressed by a different set of function calls between a first and a second CAD platform. The method includes abstracting functions of the first CAD platform into a generic set of function calls building a set of generic executable functions based on the generic set of function calls, translating function calls from the second CAD platform into function calls for addressing the set of generic executable functions, and executing the generic executable functions according to the translated function calls.

In yet another embodiment of the present invention, an apparatus is provided for executing CAD platform-neutral functions. The apparatus includes a generic CAD function emulator that builds a set of generic CAD functions from selected specific CAD functions, a CAD-neutral library that stores the set of generic CAD functions, and a plurality of CAD drivers coupled with the CAD-neutral library, each one configured to interact with a separate one of the plurality of CAD platforms, that receive a function call for a platform-specific function, and direct the function call to a corresponding generic function.

DESCRIPTION OF THE SPECIFIC EMBODIMENTS

Figure 1:
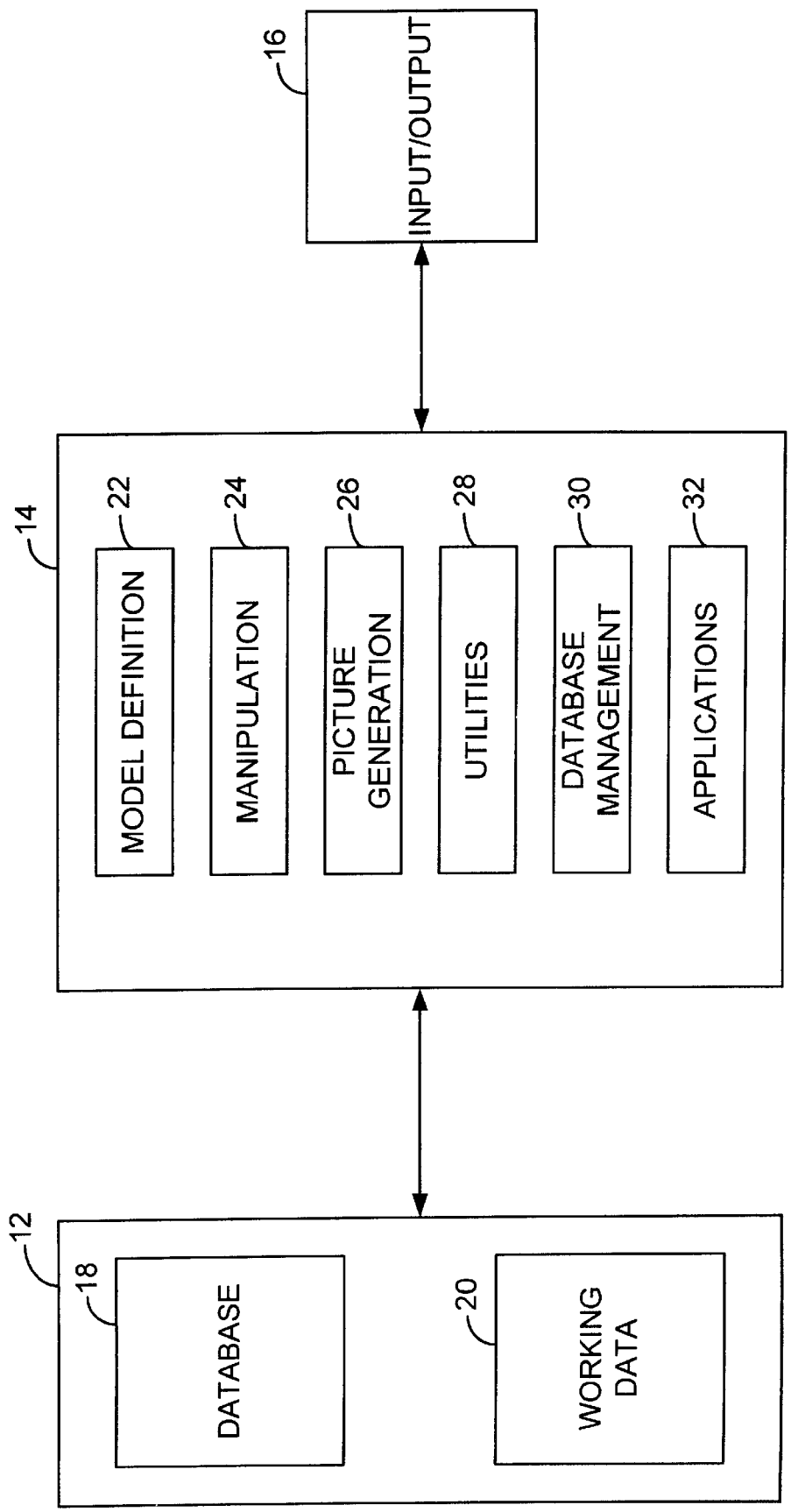
FIG. 1 illustrates simplified block diagram of a CAD platform in a CAD system.
Figure 2:
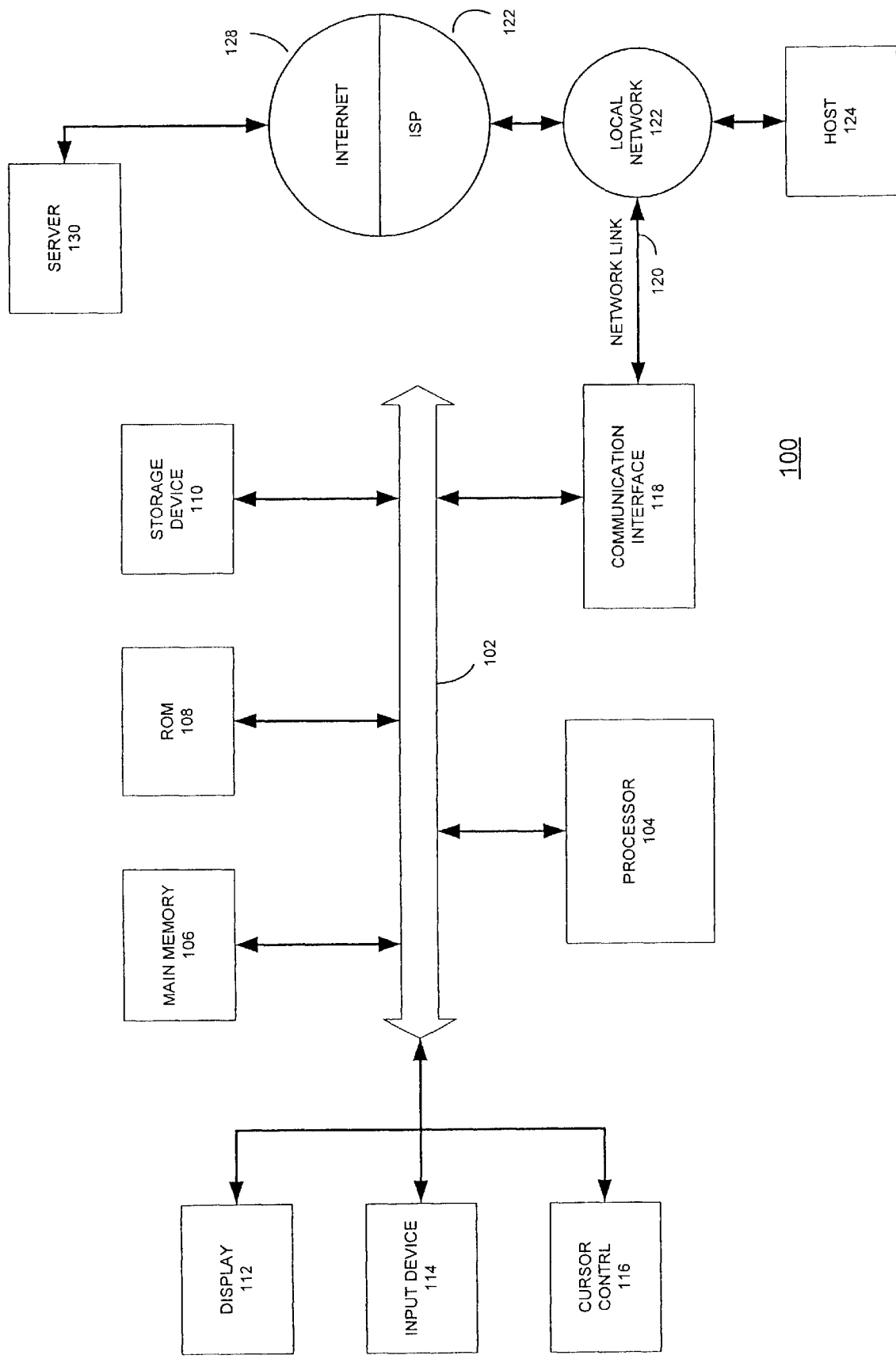
FIG. 2 shows a simplified block diagram of a computer system suitable for use with an embodiment of the present invention.
Figure 3:
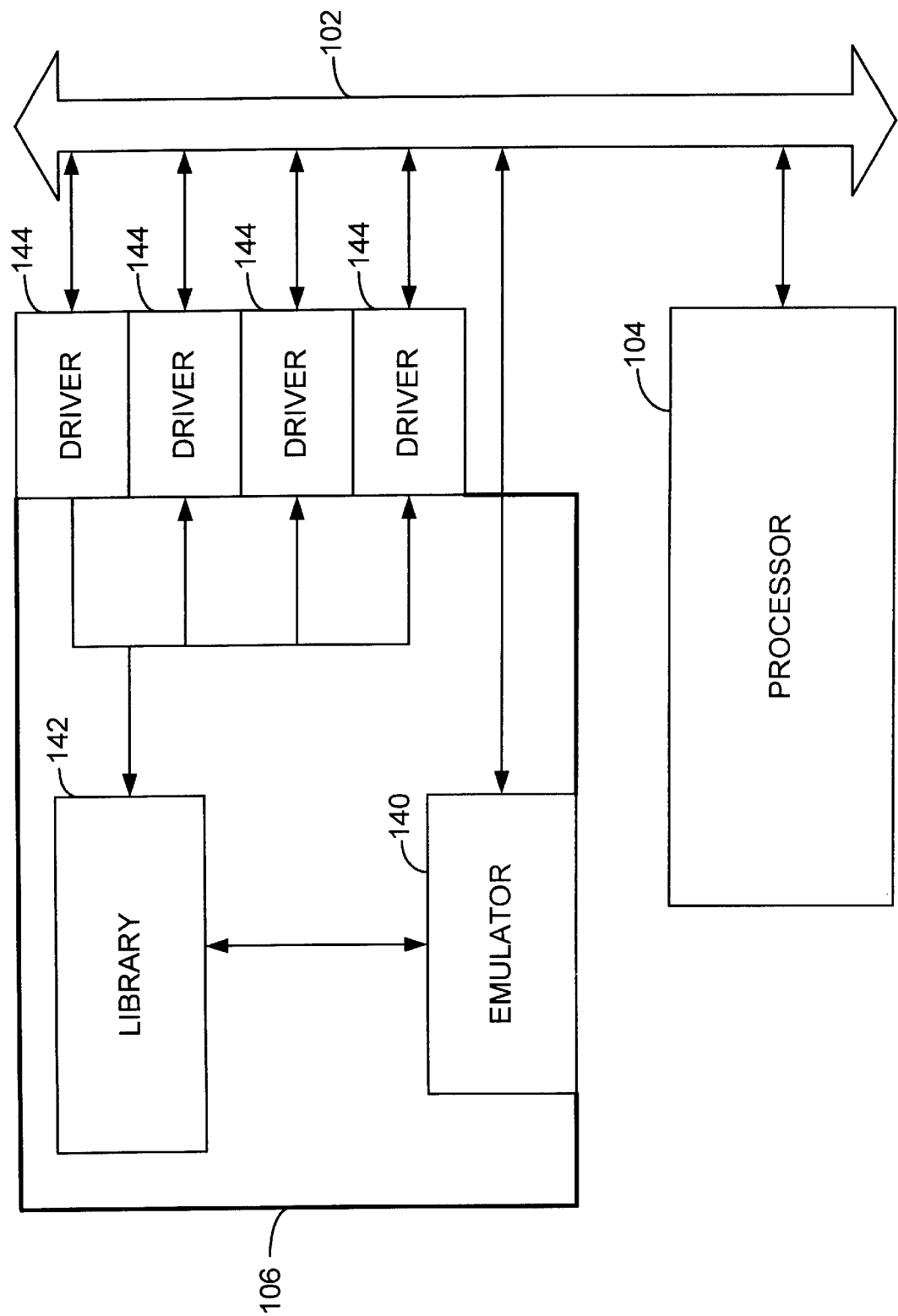
FIG. 3 is a functional block diagram of a preferred embodiment of the invention.

FIG. 2 shows a simplified block diagram of a computer system 100 suitable for use with an embodiment of the present invention. Computer system 100 includes a bus 102 or other communication medium for communicating information, and a processor 104 coupled with the bus for processing information according to predefined CAD instructions. Computer system 100 also includes a main memory 106 coupled to bus 102, such as a random access memory (RAM) or other dynamic storage device for storing executable codes and instructions for use by the processor 104. The main memory 106 also may be used for storing temporary variable or other intermediate information during execution of instructions by the processor 104, such as model data representing entities to be modeled, or map data for mapping CAD platform-specific function calls to a set of generic function calls for performing a substantially identical CAD function. Computer system 1 00 further includes a read only memory (ROM) 108 or other static storage device coupled to bus 102 for storing static information and instructions for processor 104. A storage device 110, such as a magnetic disk or optical disk, may be provided for storing information and instructions.

Computer system 100 includes a display 112, such as a high-definition computer monitor or color graphics monitor, for displaying information to a computer user. Display 112 is used primarily for displaying results of executable instructions by the processor, such as manipulation of model data to graphically illustrate an entity of a product. For example, the display 112 receives information from the bus 102 from which it can generate a graphic for visually illustrating geometry, dimension, surface conditions, or associated numerical data of an entity to a user.

An input device 114, including alphanumeric and other keys, is coupled to bus 102 for communicating information and command selections to processor 104. Another type of user input device is cursor control 116, such as a mouse, a trackball, or cursor direction keys for communicating direction and command information to the processor 104, and for controlling graphical manipulations of an entity being displayed on the display 112.

The present invention relates to the use of a computer system for computer aided design functions. According to one embodiment of the invention, function calls are provided by a user via either input device 114 or cursor control 116, specifying a desired function to be performed on a graphical entity, the result of which is then displayed on the display 112. The function calls are translated into a series of instructions for execution by the processor 104 for manipulating model data representing an entity, which in turn manipulates information provided to the display. Execution of sequences of instructions contained in main memory 106 causes the processor 104 to perform the process steps described herein. One or more processors in a parallel- or multi-processing arrangement may also be suitably employed to execute CAD functions according to an embodiment of the invention. In alternative embodiments of the invention, hard-wired circuitry such as field programmable gate arrays (FPGAs) and system programmable gate arrays (SPGAs) may be used to implement the invention. Thus, embodiments of the invention are not limited to any specific combination of hardware and software.

The present invention also relates to an application programming interface (API) for performing CAD functions on any one of various different CAD platforms. The term API as used herein refers to a library of procedures, i.e.: function calls, that may be invoked by the computer system processor 104 for performing a variety of system functions. The functions performed by the API include: accessing data values for model entities; add, modify, or delete geometric entities; access and set values for model entities; create views; interact with the CAD operator via an input/output channel; and add other user functions.

The term "computer-readable medium" as used herein refers to any medium that is accessible by, or used for providing instructions to the processor 104 for execution. Such a medium may take many forms, including, but not limited to, nonvolatile media, volatile media and transmission media. Non-volatile media include, for example, optical or magnetic disks, such as storage device 110. Volatile media include dynamic memory, such as main memory 106. Transmission media include coaxial cable, copper wire, fiber optic, the wires that form the bus 102. Transmission media can also take the form of a wireless transmission technique. Common forms of computer-readable media include disk drives, CD-ROM, DVD, or any other optical- or laser-readable medium.

Various forms of computer-readable media may be involved in carrying out one or more sequences of one or more instructions to processor 104 for execution. For example, the instructions may initially be borne on a compact disk or digital video disk from a remote computer system or server. Or, instructions may be sent via the internet 128 from a remote server 130. Such instructions are received at a local network 122, and communicated to the computer system hosting the present invention via communication interface 118. From the communication interface via the bus, instructions may be uploaded into a memory such as main memory 106 for later execution by the processor 104.

Communication interface 118 provides a two-way data communication coupling to a network link 120 that is connected to a local network 122. The local network may also be connected to other computer systems having a communication interface, for sharing data and instructions. Wireless links may also implement the communication interface and network links.

Data received by the computer system 100 may take the form of program code having instructions for the processor 104 to execute particular functions. The program code directs the processor to address the database implemented in main memory 106 for further instructions. The instructions implement what is known as an application. An application consists of a set of instructions for causing the processor to perform a general set of applied functions. In a preferred embodiment of the present invention, the interface for executing CAD functions is implemented as an API, at an application-level program code structure. The present invention allows for CAD-neutral execution of generic functions, as implemented in a CAD-neutral API (CNAPI). CNAPI is the programming mechanism by which a suite of CAD platforms are able to perform basic CAD functionality regardless of which native CAD platform the customer is using. CNAPI has several main benefits:

1) A user may run SelectCAD products on any CAD platform for which a CNAPI driver is written. With the exception of a few items that are truly CAD specific, the user interface and workflow of SelectCAD products are exactly the same for all CAD platforms. For example, CAD drivers may be implemented for CAD platforms such as AutoCAD 13, AutoCAD 14, IntelliCAD and MicroStation. A CNAPI driver may be written for any other CAD platforms that support a minimum set of CAD functionality.

2) The development of applications that can run on multiple CAD platforms becomes much simpler and faster with CNAPI. This is because as the application and computational code communicates with the CAD through the abstract CNAPI layer and the native CNAPI driver takes care of the differences in the CAD platform. Therefore as long as the developer follows the rules of the CNAPI, the functionality will run on any CAD platform supported. The core functionality is exactly the same and does not need to re-compile or re-link with separate code to handle the CAD interaction.

In an embodiment of the present invention, functions that make up part of a first CAD platform are emulated using function calls into a second CAD platform, without changing any function names, arguments, or return values of functions of the first CAD platform. Thus, function calls to the computational layer functions of the first CAD platform are unchanged.

The CNAPI Layer defines which CAD-neutral functions are available to the user or applications programmer. In a specific exemplary embodiment, the CNAPI Driver is an implementation of that set of functions to which calls are appropriately directed and handled for a native CAD package. The CNAPI layer according to the present invention may consist of a fairly thin layer of code that relays the function calls to the appropriate CAD Driver. In an exemplary embodiment, this layer includes two [DLL's] libraries of available functions, civmdl.dll, listed in Appendix A, and cnapi.dll, listed in Appendix B, that handle dynamic loading and swapping of CAD Drivers at runtime and the redirection of CAD function calls. In a preferred embodiment, there is one CNAPI Driver for each CAD platform available.

Run-Time Operation

Before running a particular SelectCAD application, the user sets or changes the desired native CAD application with a tool called SelctCAD.exe. This tool saves the name of the native CAD application in a registry. When a SelectCAD application starts up, it queries the registry for the native CAD application set by the user, and looks up the path to the CAD Driver. SelectCAD then loads the CAD Driver and ensures that the native CAD application is properly installed on the machine. If it is, then SelectCAD instructs the CAD Driver to load the native CAD application (through a call to CNAPILoadCADApp) and to have that CAD application load the rest of the SelectCAD product. If the user wants to run SelectCAD on a different CAD platform, all that is required is running SelctCAD.exe to reset the desired native CAD platform.

Function Call Routing

There are either one or two run-time redirections that take place when making a CNAPI function call. Regardless of the native CAD package, if the desired CAD functionality exists in a library of one of the supported CAD platforms, such as MicroStation's MDL library, for example, then the application calls the available CAD platform emulation in the CNAPI layer (i.e.: found in the "civmdl.dll" library). The available CAD platform emulation routine loads the native CAD platform and if the function of that same name exists in that native CAD application, the function is called directly. Typically, the function will only be available if the native CAD platform matches the available CAD platform, since the function calls are native to the available CAD platform language. Otherwise, it either calls the CAD Driver for a CNAPI emulation of the function or it emulates the function call if the native CAD is not really necessary. If the required functionality is not part of the available CAD platform library, then the caller should directly call the CNAPI function.

The following is an example of CNAPI using MDL:

```
ULong mdlElmdscr_add (MSElementDescr *edP)
{
    static FARPROC pFunc=NULL;
    static boolean bFirst=TRUE;
    if (bFirst)
    {
        Func=GetProcAddress
            (GetCadDriverModuleHandle( ), "mdlElmdscr_
            add");
        bFirst=FALSE;
    }
    if (pFunc)
        return (*(ULong(*)(MSElementDescr*))pFunc)
            (edP);
    else
        return CNAPIElmdscrAdd(edP);
}
```

This function is called the same way as it would have been if the caller was writing an MDL application. The first time this function is called, the CAD module is queried for the actual name of the function, mdlElmdscr_add. If the native CAD library has this function implemented, which would only be the case for the MicroStation CAD platform, it is called directly. If it is not in the native CAD library, then a different emulation function named CNAPIElmdscrAdd is called.

```
ULong CNAPIElmdscrAdd (MSElementDescr *edP)
{
    static FARPROC pFunc=NULL;
    static BOOL bFirst=TRUE;
    if (s_hCadDriver && bFirst)
    {
        pFunc=GetProcAddress(s_hCadDriver,
            "CNAPIElmdscrAdd");
        bFirst=FALSE;
    }
    if (s_hCaddriver && pFunc)
        return (*(ULong(*)(MSElementDescr*))pFunc)
            (edP);
    else
        return 0;
}
```

The implementation of CNAPIElmdscrAdd in the Cad Driver will essentially add an element of specified given type to the drawing file. In AutoCAD, for instance, the MSElementDescr would be analyzed and a graphically equivalent AutoCAD entity would be created and placed in the drawing using the AutoCAD functions available through its ADS (AutoCAD Development System) API.

For functionality that is CAD platform-specific but is not something that can be directly implemented using the MDL function library, a direct CNAPI call is possible. For instance, the terminology used and functionality available in a specific CAD platform may differ significantly from one to the next. If we want to bring up a symbology dialog box for presenting line symbology to the user, we call a CNAPI function like CNAPIShowLineSymbology directly. Each CAD driver is responsible for implementing a dialog screen which displays that particular CAD platform's "flavor" of symbology using the appropriate fields and terminology.

Figure 4:
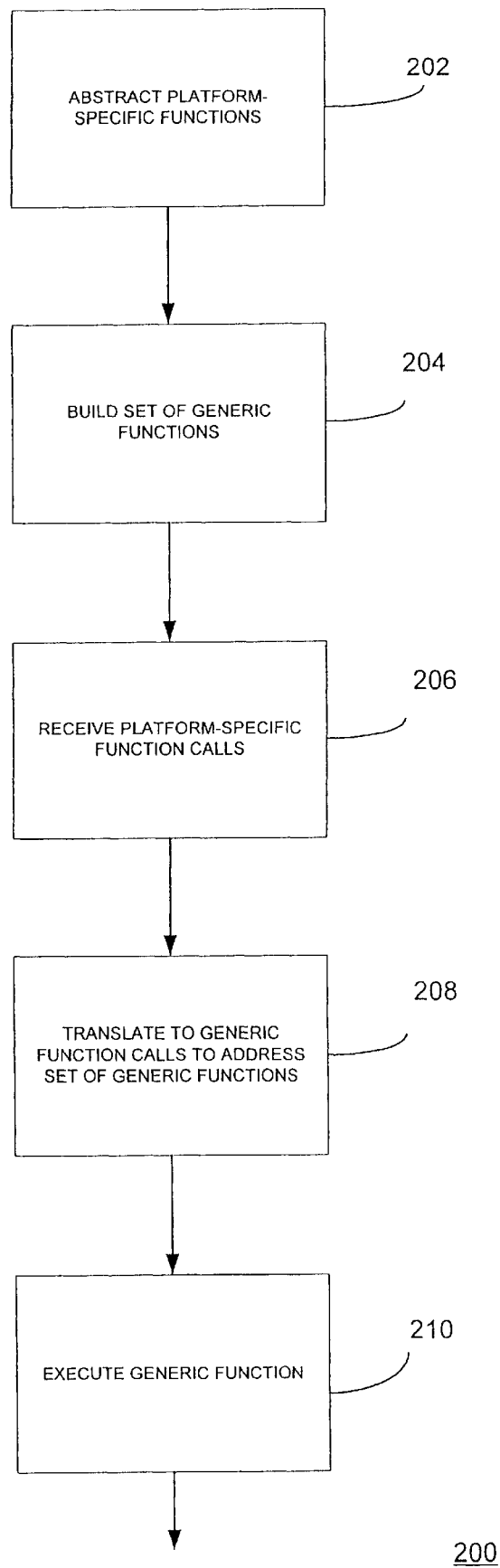
FIG. 4 is a flow chart illustrating a method according to an embodiment of the present invention.

FIG. 4 is a flow-chart 200 illustrating an embodiment of the present invention. At block 202, the CNAPI will perform an abstraction of platform-specific function calls, saving as much of the arguments and specifications as possible. At block 204, the CNAPI builds a set of generic function calls from the abstractions. The set of generic function calls will then be stored, preferably in a library addressable by calls, or function calls. A specific call address a specific function. Depending upon what platform is currently running on the CAD system, at block 206 one or more platform-specific function calls are received by the CNAPI. At block 208, the CNAPI translates the received function calls into generic function calls, which are in turn employed to address specific functions within the set of generic functions. In a preferred embodiment, the translation involves a mapping of a received call to a corresponding generic call, in an attempt to address a function which will yield a graphically equivalent manipulation of data being displayed. At block 210, the addressed generic function is implemented. Thus, instead of having to store many individual sets of functions and logic required to recognize each set of platform-specific function calls, the present invention provides one set of generic functions and associated calls adaptable to any CAD platform being run.

Figure 5:
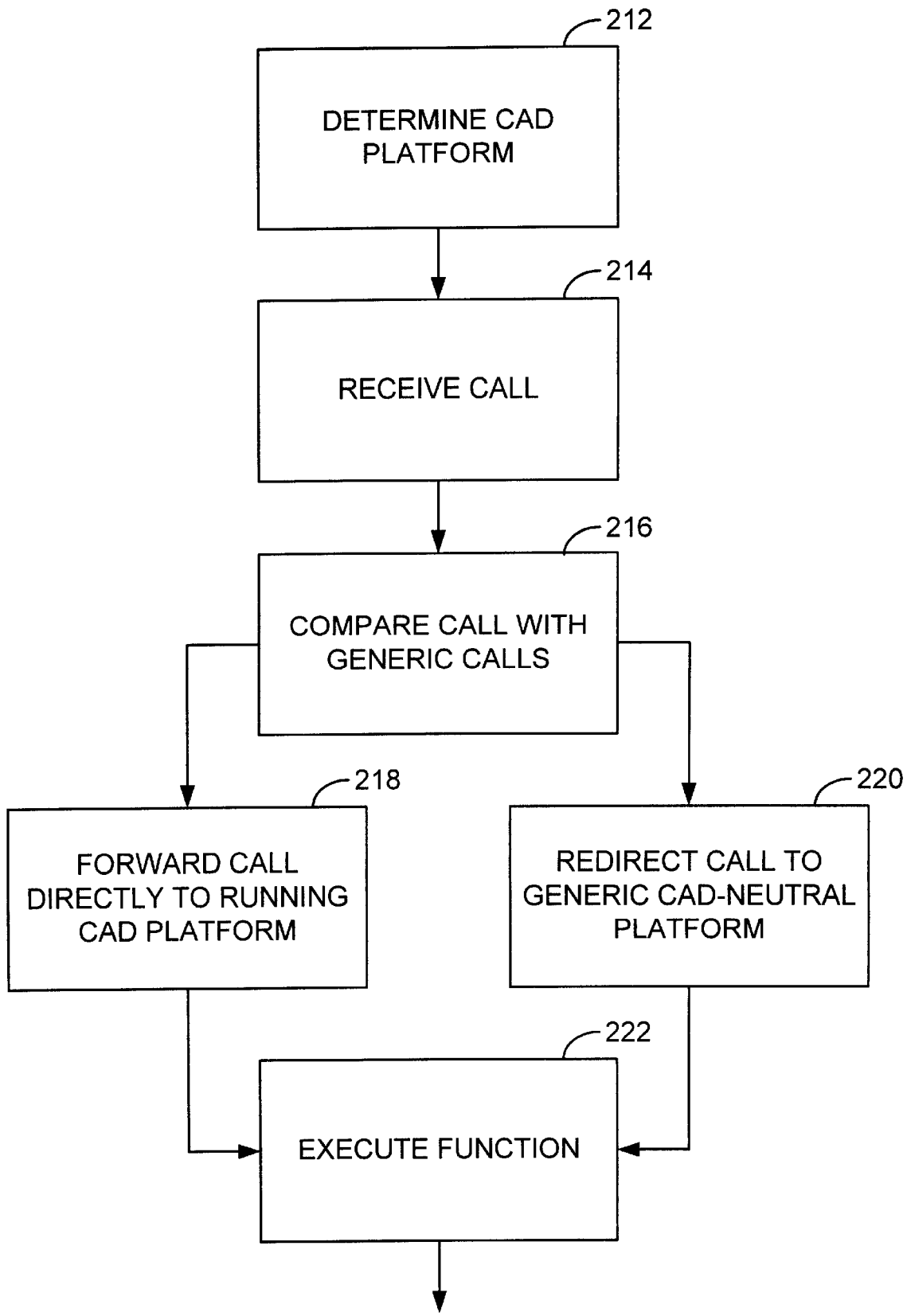
FIG. 5 is flow chart illustrating an alternative method according to an embodiment of the present invention.

FIG. 5 shows a flow chart 211 of another aspect of the present invention. At block 212, the CNAPI determines which CAD platform is currently running on the CAD system. At block 214, the CNAPI receives a call from the running CAD platform. Since the set of generic functions may be based upon specific functions from one of the many CAD platforms, at block 216 the CNAPI compares the received call with a set of generic calls stored in a memory. If the generic calls were based on the calls employed by the running CAD platform, at block 218 the call is forwarded directly to the running platform for execution at block 222. Otherwise, if the generic calls must be mapped to a corresponding incoming call not providing the basis of the generic calls, the received call is redirected to the CNAPI generic calls at block 220.

In sum, when CAD functionality is needed, the CIVMDL or CNAPI functions are called directly. These functions decide whether or not the native CAD platform can handle the function call with the given arguments, and if it can, the native function is called directly. If it can't be handled directly, the functionality is emulated in some other way with calls to the native CAD platform's API.

While the above is a complete description of specific embodiments of the present invention, various modifications, variations, and alternatives may be employed. These alternatives may appear to those skilled in the art; hence, the scope of this invention should not be limited to the embodiments described, but are instead defined by the following claims.

What is claimed is:

1. In a computer-aided design (CAD) system including a processor for executing one of a plurality of CAD platforms and a memory for storing a plurality of generic CAD functions, where the generic CAD functions are emulated after functions supported by a selected one of the plurality of CAD platforms, a method of executing neutral CAD functions comprising the steps of:

determining which one of the plurality of the CAD plaforms is running;

receiving a call to a specific CAD function via the running CAD platform; and forwarding the call directly to the running CAD platform if the running CAD platform is equivalent to the selected CAD platforms, otherwise redirecting the call to a corresponding one of the generic CAD functions in the memory.

2. The method according to claim 1, further comprising the step of executing the specific CAD function or the corresponding generic CAD function by the processor.

3. The method according to claim 1, wherein the generic CAD functions are created within an application layer.

4. The method according to claim 1, further comprising:

supporting a second one of the plurality of CAD platforms;

receiving a call for a specific CAD function via the second one of the plurality of CAD platforms; and translating the call into a generic call; and accessing a generic function from the generic set of CAD functions, wherein the generic function corresponds to the specific function.

5. The method according to claim 4, wherein the second CAD platform is different from the one of the plurality of CAD platforms.

6. In a computer-aided design (CAD) system, a method of executing functional manipulations of model data representing an entity, wherein specific functions of the functional manipulations are addressed by a different set of function calls between a first and a second CAD platform, the method comprising the steps of:

abstracting functions of the first CAD platform into a generic set of function calls;

building a set of generic executable functions based on the generic set of function calls;

translating function calls from the second CAD platform into function calls for addressing the set of generic executable functions; and executing the generic executable functions according to the translated function calls.

7. The method of claim 6, further comprising the steps of:

abstracting functions of the second CAD platform into a second generic set of function calls; and adding generic functions to the set of generic executable functions based on the second generic set of function calls.

8. In a computer-aided design (CAD) system having a processor supporting a plurality of CAD platforms, wherein each platform includes program code and a database, the database storing a library of functions addressable by corresponding function calls, and the program code directing the processor to execute specific CAD functions, an apparatus comprising:

a generic CAD function emulator that builds a set of generic CAD functions from selected specific CAD functions;

a CAD-neutral library that stores the set of generic CAD functions; and a plurality of CAD drivers coupled with the CAD-neutral library, each one configured to interact with a separate one of the plurality of CAD platforms, that receive a function call for a platform-specific function, and direct the function call to a corresponding generic function.

9. The apparatus of claim 8, wherein the generic CAD function emulator is an application programming interface (API) executed by the CAD system.

10. The apparatus of claim 8, further comprising means for determining which one of the plurality of CAD platforms is running.

11. The apparatus of claim 8, further comprising a CAD-neutral processor for executing the corresponding generic function.

12. The apparatus of claim 10, wherein the generic CAD function emulator operates in run-time according to instructions from the determined CAD platform.

* * * * *